US007663085B2

(12) United States Patent
Sugiyama (10) Patent No.: US 7,663,085 B2
(45) Date of Patent: Feb. 16, 2010

(54) OPTICAL SENSOR AND METHOD OF SELECTION OF PIXEL OF OPTICAL SENSOR

(75) Inventor: Toshinobu Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/265,880

(22) Filed: Nov. 6, 2008

(65) Prior Publication Data
US 2009/0066824 A1    Mar. 12, 2009

Related U.S. Application Data

(63) Continuation of application No. 11/666,103, filed on Apr. 23, 2007, now Pat. No. 7,534,983.

(51) Int. Cl.
*H01L 27/00* (2006.01)
(52) U.S. Cl. .............................. 250/208.1; 250/214 R
(58) Field of Classification Search .............. 250/208.1, 250/214 R, 214.1; 348/301–320
See application file for complete search history.

(56) References Cited

U.S. PATENT DOCUMENTS 5,850,471 A * 12/1998 Brett .......................... 382/162

7,030,924 B2   4/2006 Hatase et al.
2002/0163491 A1   11/2002 Yoshimura et al.

FOREIGN PATENT DOCUMENTS

| JP | 11-284911 | 10/1999 |
|---|---|---|
| JP | 2003-304451 | 10/2003 |

\* cited by examiner

*Primary Examiner*—Que T Le
(74) *Attorney, Agent, or Firm*—Robert J. Depke; Rockey, Depke & Lyons, LLC (57) ABSTRACT

An optical sensor able to make a pixel area small without degrading an increase of the speed of detection of the change of light intensity and reduction of the power consumption, therefore able reduce the size of a chip at the time of an increase of pixels and a method of selection of pixels of the same, imparting a function of holding charges corresponding to a light reception intensity of a previous frame and a function for comparing strongness/weakness of the light reception intensity of the previous frame and the light reception intensity of the current frame to each of the pixels composing a pixel array part and configuring both function portions by a capacitor Cs connected between a photodiode PD and a selection transistor T2.

11 Claims, 12 Drawing Sheets

OPTICAL SENSOR AND METHOD OF SELECTION OF PIXEL OF OPTICAL SENSOR

The subject matter of application Ser. No. 11/666,103, is incorporated herein by reference. The present application is a Divisional of U.S. Ser. No. 11/666,103, filed on Apr. 23, 2007, which is a 371 U.S. National Stage filing of PCT application PCT/JP2005/020187, filed Nov. 2, 2005, which claims priority to Japanese Patent Application Number JP 2004-322598, filed Nov. 5, 2004. The present application claims priority to these previously filed applications.

TECHNICAL FIELD

The present invention relates to an optical sensor used in optical communication etc. using a light emitting diode (LED) light source and a pixel selection method for selecting read pixels from among a plurality of pixels composing this optical sensor.

BACKGROUND ART

In recent years, along with the higher luminance of LED light sources, fluorescent lamps, incandescent bulbs, and other light sources used in illumination lights, headlights of automobile, signal lights, etc. up until now have been gradually replaced by LEDs. When further increasing the luminance and light emission efficiency of LEDs in the future, it is predicted that all types of surrounding light sources will be replaced by LEDs.

On the other hand, considering this future situation, there has been attempted to utilize these LED light sources not only for merely illumination light or merely alarm light, but also as high speed communicating means ranking with wireless communications etc. Researches etc. are being conducted to develop optical wireless use high speed vision chips which are light receiving devices assuming such communicating means. Further, visible ray communication consortiums etc. aimed at the spread of these communication systems have been already formed.

Further, camera systems and applications, using blinking of such LEDs for communications, have been proposed (see for example Patent Document 1). This relates to a camera system. This camera system has the function of acquiring an ordinary image and discriminating a blinking pattern of the LEDs and other light sources, which is coded according some sort of information. When such light sources are set as a variety of objects in real space, it becomes possible to simultaneously acquire images of those objects and information accompanying those.

A variety of applications can be considered for such a system. For example, by emitting a network ID as the information, it is possible to form a means for establishing a communication connection between the object and a terminal mounting a camera thereon and to utilize the same in a navigation system providing positional information, advertising means. etc.

As an imaging means for realizing such a camera system, there is one holding frame memories and comparators within the pixels composing an image sensor. This imaging element has the function of outputting an increase/decrease of light intensity over time as binary data by comparing the light received in a certain frame period with signal information of a previous frame stored in the frame memory for each pixel. When using this function, highly efficient detection of a blinking signal of a light source such as the above application becomes possible.

Patent Document 1: Japanese Patent Publication (A) No. 2001-292379 (page 5, FIG. 1)

DISCLOSURE OF THE INVENTION

Problem to be Solved by the Invention

However, architecture providing frame memories and comparators within the pixels as described above is suitable for detection of the change of light intensity at a high speed, but has demerits that the overall chip area becomes large and the power consumption becomes large when trying to form an array type sensor having many pixels since the area of the pixels becomes large.

Therefore, stressing compatibility with the usual image acquisition function, to realize a smaller chip size and lower power consumption, there is an optical sensor employing a configuration providing the frame memories and the comparators outside the pixels. In this optical sensor, these circuits are shared by the columns of the sensor array. The processing is performed in parallel among columns.

However, the degree of parallelness is lowered in comparison with the parallel processing of pixels in an optical sensor of an architecture providing the circuits within the pixels as described above, therefore the overall processing speed will fall. Namely, smaller size and lower power consumption can be achieved, but this is no longer suitable for high speed light detection.

The present invention provides an optical sensor able to make the pixel area smaller without degrading the increase in speed of the detection of change of light intensity and reduction of the power consumption and therefore reduce the size of the chip at the time of increase of the number of pixels and provides a method of selection of pixels of an optical sensor for further increasing the speed of detection of the change of light intensity.

Means for Solving the Problems

An optical sensor of a first aspect of the present invention is an optical sensor having a pixel array part in which a plurality of pixels are arranged, a pixel selection part for selecting read pixels in the pixel array part, and a detection part for detecting information read from a pixel selected by the pixel selection part, wherein each the pixel has a photo electric conversion part for generating a potential in accordance with an amount of light reception, and a holding and comparing part for holding the potential generated by the photo electric conversion part in a first time band and comparing the generated potential of the photo electric conversion part in a second time band with the generated potential held in the first time band.

Preferably, the photo electric conversion part includes a photodiode, the holding and comparing part includes a capacitor having a first electrode connected to the photodiode and having a second electrode connected to a selection transistor for selecting the pixel under the control of the pixel selection part, the second electrode of the capacitor is initialized by the potential of the photodiode in the first time band, and the potential of the second electrode changing according to the potential of the photodiode in the second time band is transmitted from the selection transistor to the detection part via a signal line.

Preferably, the detection part detects a potential change of the second electrode by comparing the potential of the second electrode sent from the selection transistor via the signal line with a reference potential to form binary data.

A second aspect of the present invention is a method of selection of pixels of an optical sensor having: a pixel array part in which a plurality of pixels are arranged and a pixel selection part for selecting a pixel for reading the pixel information from among the plurality of pixels, wherein the pixel for reading the pixel information is freely changed.

Preferably, a pixel satisfying predetermined conditions is discriminated, and the pixel selected is changed according to that discrimination information.

Effects of the Invention

According to the present invention, the pixel area can be made smaller without degrading the increase of speed of detection of the change of light intensity and reduction of the power consumption, therefore the chip size can be made smaller at the time of the increase in the number of pixels.

Further, by changing a pixel selection pattern so as to read any selected pixel in the pixel array part, for example, only a pixel receiving light, a further increase of speed of detection of the change of light intensity can be carried out.

EXPLANATION OF NOTATIONS 10, 10A, 10B . . . optical sensors, 11 . . . pixel array part, 12 . . . V decoder part, 13 . . . H decoder part, 14 . . . sense amplification part, Cs . . . coupling capacitor, PC, PCA . . . precharge circuits, PD . . . photodiode, SA . . . sense amplifier, T1 . . . reset transistor, T2 . . . selection transistor, and T3 . . . transfer transistor.

BEST MODE FOR CARRYING OUT THE INVENTION

Below, embodiments of the present invention will be explained with reference to the attached drawings.

First Embodiment

Figure 1:
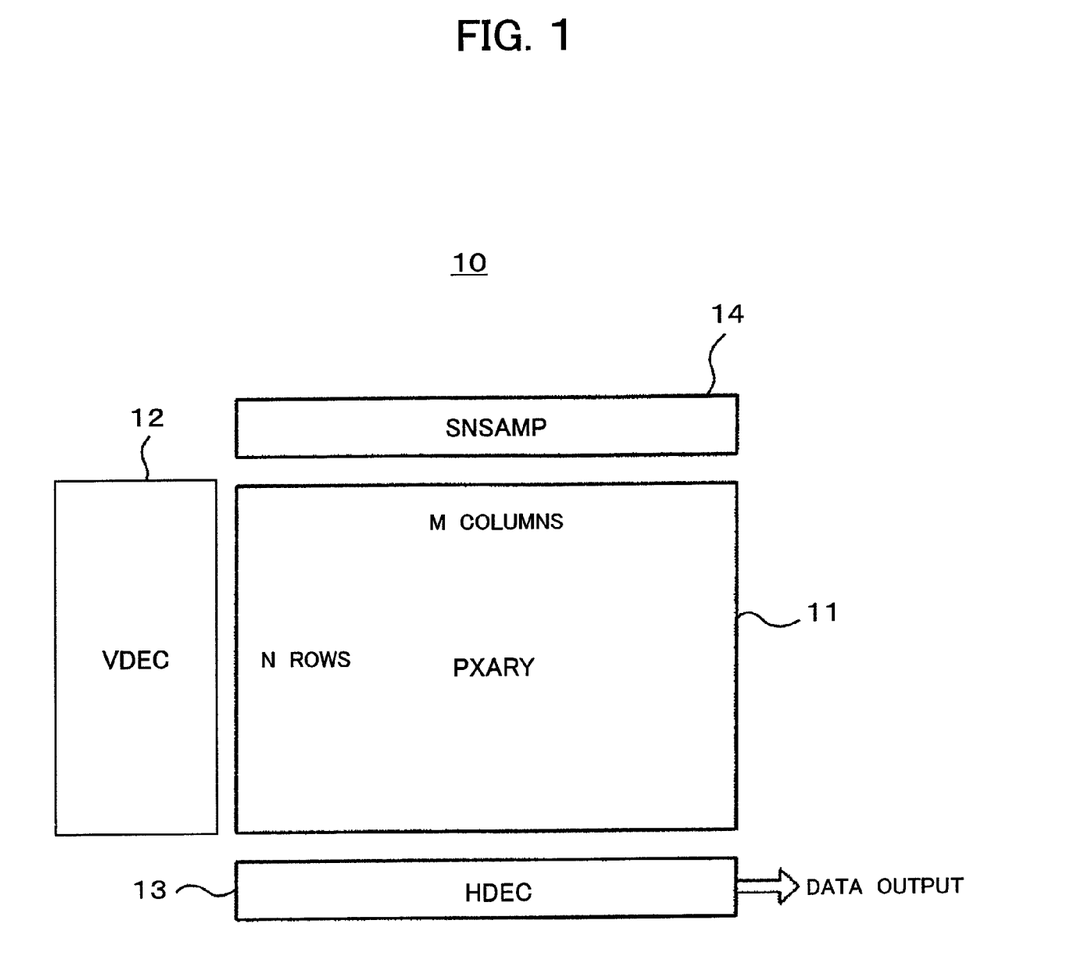
FIG. 1 is a block diagram showing the configuration of an optical sensor according to a first embodiment of the present invention.

FIG. 1 is a block diagram showing the configuration of an optical sensor according to a first embodiment of the present invention.

An optical sensor 10, as shown in FIG. 1, has a pixel array part (PXARY) 11 in which pixels are arranged in two dimensions (here, arranged in M number of columns and N number of rows), a vertical (V) decoder part (VDEC) 12 for selecting a row, a horizontal (H) decoder part (HDEC) 13 for selecting a column, and a sense amplification part (SNSAMP) 14 for detecting a signal line potential and deciding a change of light intensity of a pixel.

The V decoder part 12 and the H decoder part 13 form a pixel selection part, and the sense amplification part 14 forms a detection part.

Figure 2A:
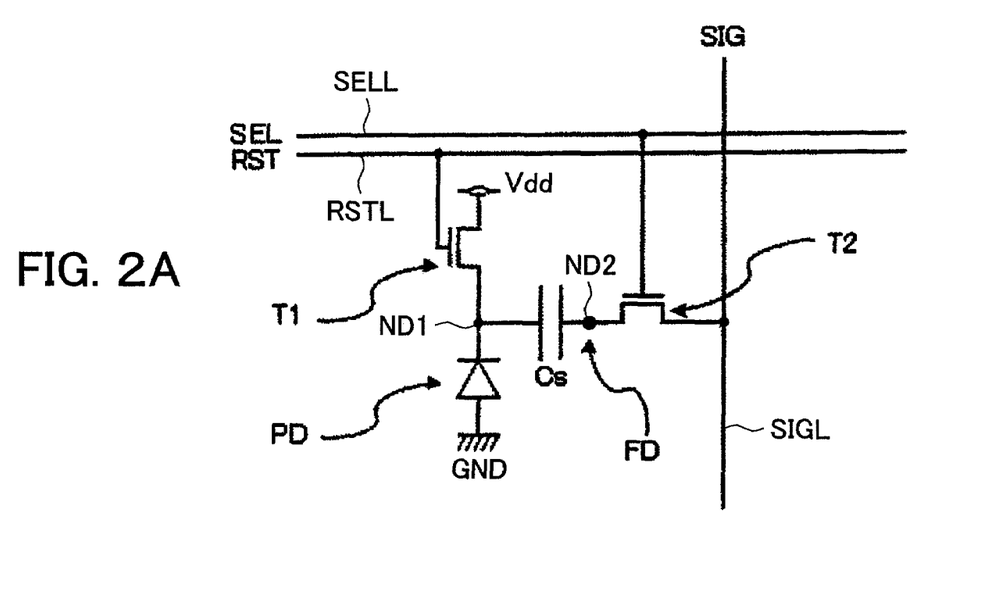
FIG. 2A and FIG. 2B are circuit diagrams showing the configuration corresponding to one pixel forming a pixel array part shown in FIG. 1.
Figure 2B:
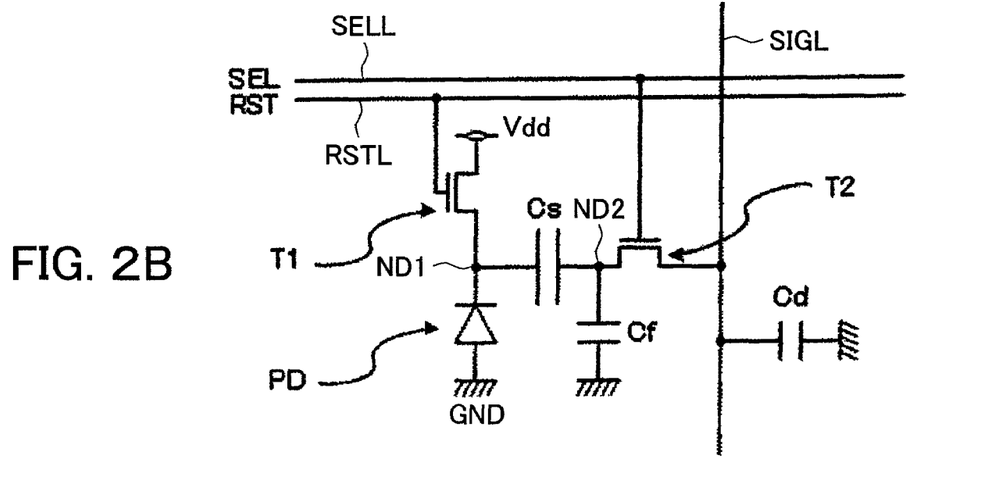

FIG. 2A and FIG. 2B are circuit diagrams showing an example of the configuration corresponding to one pixel forming the pixel array part 11 of FIG. 1.

A pixel PXL is, basically, as shown in FIG. 2A, comprised of a photodiode PD for receiving the light and storing an charge, a reset transistor T1 for resetting this photodiode PD, a selection transistor T2 for selecting the pixel, and a coupling capacitor Cs as a holding and comparing part between the photodiode PD and the selection transistor T2.

An anode of a photodiode PD1 is grounded, and its cathode is connected to a node ND1. A source and drain of the reset transistor T1 are connected between a power supply potential Vdd and the node ND1. A gate of the reset transistor T1 is connected to a reset line RSTL to which a reset signal RST is applied by the V decoder part 12 at a predetermined timing.

The first electrode of the coupling capacitor Cs is connected to the node ND1, and the second electrode is connected to a node ND2. Then, a source and drain of the selection transistor T2 are connected to the node ND2 and a signal line SIGL. In other words, the output of the selection transistor T2 is connected to the signal line SIGL. To the signal line SIGL, a read signal SIG of the pixel PXL is read out. The gate of the selection transistor T2 is connected to a selection line SELL to which a selection signal SEL is applied by the V decoder part 12 at a predetermined timing.

Further, in the pixel PXL, the floating node ND2 of a connection part of the selection transistor T2 and the coupling capacitor Cs is defined as a floating diffusion FD.

Further, FIG. 2B shows a state where a capacitance Cf of the floating diffusion FD and a parasitic capacitance Cd of the signal line SIGL are added to the pixel structure of FIG. 2A.

Figure 3:
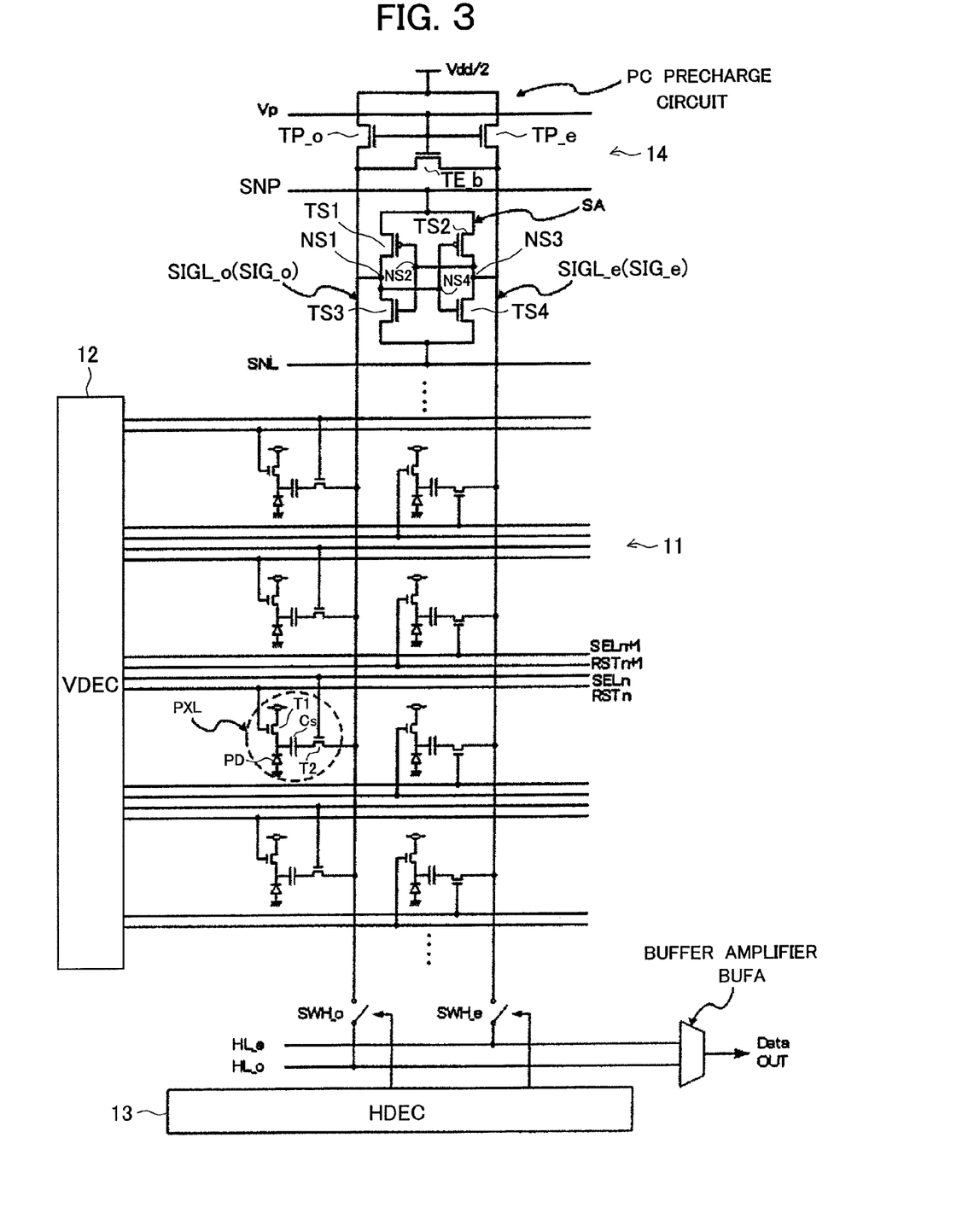
FIG. 3 is a circuit diagram showing two columns' worth of the circuit configuration of the pixel array part shown in FIG. 1.

FIG. 3 is a circuit diagram showing two columns' worth of the circuit configuration of the pixel array part 11 of FIG. 1.

Each column is configured by a set of an odd number column (odd) and even number column (even). A sense amplifier SA, a precharge circuit PC, etc. are provided corresponding to each set. The sense amplifier SA and the precharge circuit PC are components included in for example a sense amplification part 14 of FIG. 1.

The precharge circuit PC of FIG. 3 has a precharge transistor TP_o having a source and drain connected between a potential Vdd/2 of ½ of the power supply potential Vdd and one end of a signal line SIGL_o of the odd number column, a precharge transistor TP_e having a source and drain connected between the potential Vdd/2 and one end of a signal line SIGL_e of the even number column, and an equalize transistor TE having a source and drain connected between one end of the signal line SIGL_o of the odd number column and one end of the signal line SIGL_e.

Then, gates of the precharge transistors TP_o and TP_e and the equalize transistor TE are commonly connected to a precharge line PCL to which a precharge signal Vp is applied at a predetermined timing.

The sense amplifier SA of FIG. 3 has p-channel MOS transistors TS1 and TS2 and n-channel MOS transistors TS3 and TS4. Sources of the transistors TS1 and TS2 are connected to a bias potential SNP, and sources of the transistors TS3 and TS4 are connected to a bias potential SNL.

Drains and gates of the transistors TS1 and TS3 are connected to each other to form a first CMOS inverter. An output node NS1 of the first CMOS inverter is formed by the connection point of drains of the transistors TS1 and TS3, and an input node NS2 of the first CMOS inverter is formed by the connection point of the gates.

Drains and gates of the transistors TS2 and TS4 are connected to each other to form a second CMOS inverter. An output node NS3 of the second CMOS inverter is formed by the connection point of drains of the transistors TS2 and TS4, and an input node NS4 of the second CMOS inverter is formed by the connection point of the gates.

By cross-connecting inputs and outputs of the first CMOS inverter and second CMOS inverter to each other (connecting the node NS1 and the node NS4 and connecting the node NS2 and the node NS3), the node NS1 is connected to the signal line SIGL_o of the odd number column and the node NS3 is connected to the signal line SIGL_e of the even number column, whereby a latch type sense amplifier is formed.

Further, the other end side of the signal line SIGL_o of the odd number column is connected via a horizontal switch SWH_o to a horizontal output signal line HL_o on the odd number side. The other end side of the signal line SIGL_e of the even number column is connected via a horizontal switch SWH_e to a horizontal output signal HL_e on the odd number side.

Then, first end portions of the horizontal output signal lines HL_o and HL_e are connected to a buffer amplifier BUFA, and the data is output from the buffer amplifier BUFA.

Further, the horizontal switches SWH o and SWH e are selectively turned ON/OFF by the H decoder part 13.

Next, an explanation will be given of the operation within a pixel of the present embodiment with reference to the timing charts of the operation in the pixel of FIG. 4A to FIG. 4C.

Figure 4A:
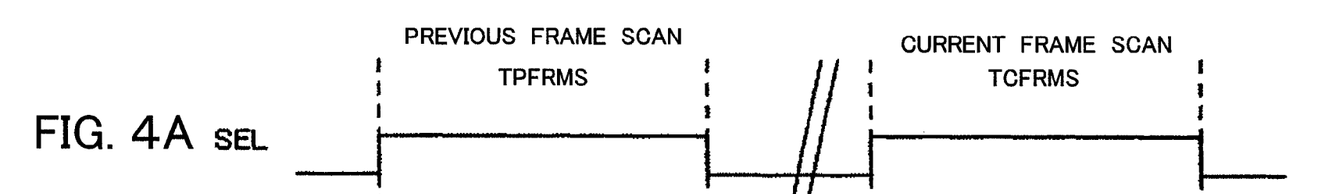
FIG. 4A to FIG. 4C are timing charts for explaining the operation within the pixel shown in FIG. 2.
Figure 4B:
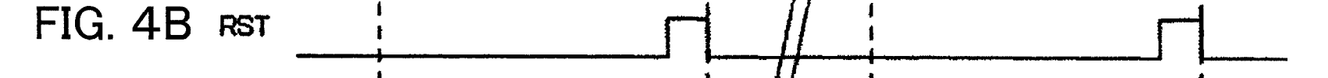
Figure 4C:
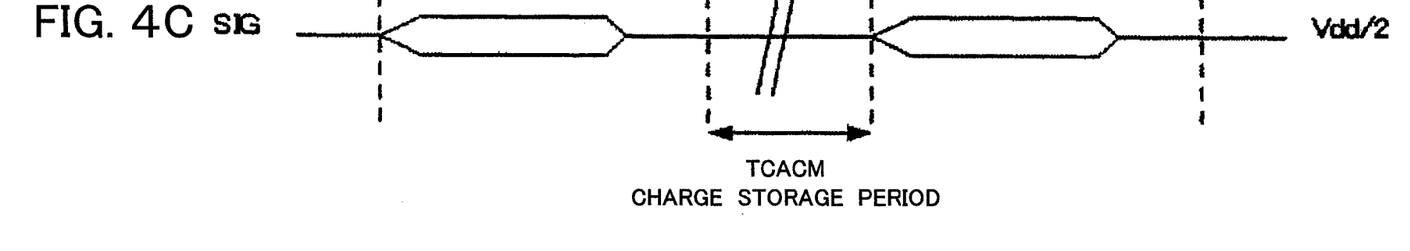

FIG. 4A indicates the selection signal SEL applied to the selection line SELL, FIG. 4B indicates the reset signal RST applied to the reset line RSTL, and FIG. 4C indicates the potential SIG of the signal line SIGL.

Further, in the figures, TPFRMS indicates a previous frame scan period, TCFRMS indicates a current frame scan period, and TCAMC indicates a charge storage period.

Here, the pixel shown in FIG. 2 compares the light intensities of one previous frame (previous frame) and the current frame period (current frame) for each frame scan and outputs the strong/weak result as a potential change with respect to the reference potential.

First, in the operation of the previous frame scan period TPFRMS of FIG. 4A to FIG. 4C, in a state where the potential corresponding to the light intensity appears on the photodiode PD shown in FIG. 2A, the node FD is charged to the potential of Vdd/2 (Vdd is the power supply voltage) by the signal line SIGL.

At this time, in the photodiode PD, the potential corresponding to the incident light of the previous frame scan period TPFRMS appears on the photodiode PD side of the coupling capacitor Cs, therefore a charge corresponding to that is stored in the node FD (floating diffusion). Thereafter, the photodiode PD is reset by the reset transistor T1, and the charge storage corresponding to the current frame is started.

In the pixel information read scan of the current frame shown in FIG. 4A to FIG. 4C, that is, the current frame scan period TCFRMS, the signal line SIGL is precharged to Vdd/2 again, then the selection transistor T2 is made ON.

At this time, while a charge corresponding to the light intensity of the previous frame was stored in the node FD, the potential of the photodiode PD changed to the potential corresponding to the light intensity of the current frame, therefore movement of charge corresponding to a difference thereof occurs.

That is, when the light intensity is stronger (the potential of PD is smaller) in the current frame than the previous frame, a negative charge is released to the signal line SIGL, and the potential SIG of the signal line SIGL becomes lower than Vdd/2.

On the other hand, when the light intensity becomes weaker (the potential of PD is larger) in the current frame than the previous frame, a positive charge is released to the signal line SIGL, and the potential SIG of the signal line SIGL becomes higher than Vdd/2.

In this way, by judging whether the direction of change of the signal line potential is higher or lower than Vdd/2 and forming the binary data of that by the sense amplifier SA, it becomes possible to judge whether the light becomes stronger or weaker in the current frame than the previous frame.

Here, where the parasitic capacitance of the signal line SIGL is Cd (see FIG. 2B), the capacitance of the coupling capacitor is Cs, and the potential change from the previous frame to the current frame is Va, the signal line potential Vsig at the time of the current frame reading becomes as in the following equation.

$$V\text{sig} = (Vdd/2) + (Cs/(Cs+Cc)*Va) \tag{1}$$

That is, according to positive/negative value of Va, the offset in the up/down direction from Vdd/2 is determined.

Next, an explanation will be given of the operation at a sensor level. In the sensor block of FIG. 1, FIG. 3 shows two columns' worth of the circuit configuration, and FIG. 5A to FIG. 5J are diagrams showing scan timings of this circuit portion. Each column is configured by a set of an odd number column (odd) and even number column (even). A sense amplifier SA, precharge circuit PC, etc. are provided corresponding to each set.

Figure 5A:
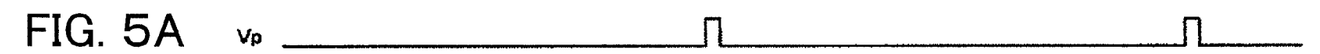
FIG. 5A to FIG. 5J are timing charts for explaining the operation of two columns' worth of the circuit shown in FIG. 3.
Figure 5B:
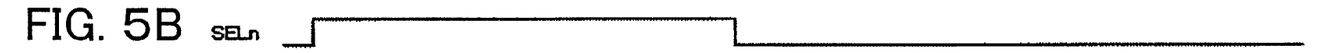
Figure 5C:
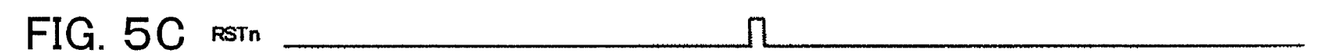
Figure 5D:
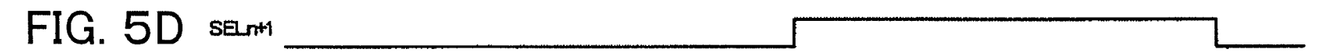
Figure 5E:
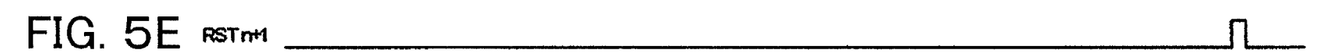
Figures 5F, 5G:
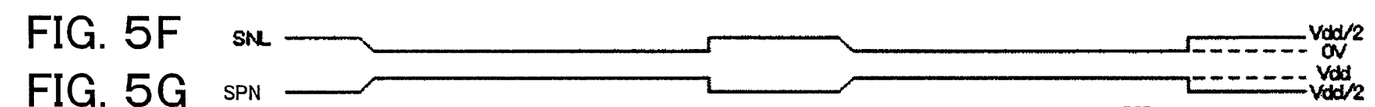
Figure 5H:
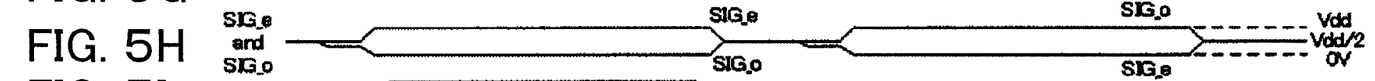
Figure 5I:
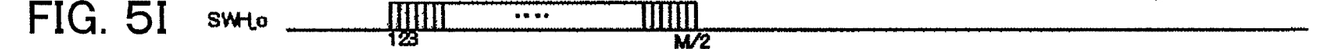
Figure 5J:
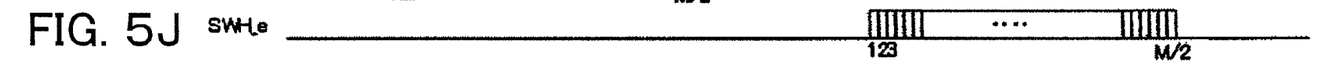

FIG. 5A indicates the precharge potential (signal) Vp applied to the precharge line PCL, FIG. 5B indicates the selection signal SELn applied to the selection line SELn of the n-th row, FIG. 5C indicates the reset signal RSTn applied to the reset line RSLLn of the n-th row, FIG. 5D indicates the selection signal SELn+1 applied to the selection line SELn+1 of the n+1-th row, FIG. 5E indicates the reset signal RSTn+1 applied to the reset line RSLLn+1 of the n+1-th row, FIG. 5F indicates the bias potential SNL on a low potential side of the sense amplifier SA, FIG. 5G indicates the bias potential SNP on a high potential side of the sense amplifier SA, FIG. 5H indicates potential SIG_o and SIG_e of the odd number and even number signal lines SIGL_o and SIGL_e, FIG. 5I indicates a state of the odd number side horizontal switch SWH_o, and FIG. 5J indicates a state of the even number side horizontal switch SWH_e.

First, an explanation will be given of the read operation of the n-th row paying attention to a pixel PXLmn.

As a prerequisite before the read operation, as explained before, by the read scan one frame before, the node FD is initialized by charge corresponding to the light signal potential of the previous frame, and one set of signal line potentials SIG_o and SIG_e is precharged to Vdd/2.

When the selection signal SELn is applied to the selection line SELL in this state and the selection transistor T2 of the pixel is turned on, the odd number side signal line potential SIG_o finely changes up or down according to the difference of light intensities between frames according to the above equation (1). The example of FIG. 3, as shown in FIG. 5H, shows a case where the potential of the signal line SIGL changes downward in comparison with Vdd/2, that is, a case where the light intensity of the received light becomes larger with respect to the previous frame.

At this time, bias potentials SNL and SNP of the sense amplifier SA are Vdd/2, the same as the precharge potential Vp, but after offset of the signal line potential, SNL and SNP are gradually changed to 0V and Vdd. At this time, the potential SIG_e of the even number side signal line SIGL_e is precharged to Vdd/2 as it is, therefore functions as the reference potential with respect to the signal line potential SIG_o of the odd number side signal line SIGL_o.

Due to this, the potential of the signal line potential SIG_o of the odd number side signal line SIGL_o is compared with SIG_e, the odd number side signal line potential SIG_o slightly lower than Vdd/2 is amplified to 0V, and the even number side signal line potential SIG_e becomes Vdd. Due to this, in the signal line SIGL_o, "0 data" corresponding to the rise of the light signal intensity to more than the previous frame is held.

Note that, when the light signal intensity falls more than the previous frame, the potential of the signal line SIG changes to higher than the Vdd/2. The sense amplifier SA detects this, and the "1" data corresponding to the rise of the light signal intensity to more than the previous frame is held in the odd number side signal line SIGL_o.

The above scan is simultaneously carried out for pixels in odd number columns located on the same n-th row. Accordingly, binary data are sequentially output to the horizontal signal line HL_o. This ON data is processed by an external signal processing circuit.

When all of the odd number columns (M/2) are read out, the precharge signal Vp is turned ON, all columns are precharged to Vdd/2, and the bias potentials SNL and SNP are returned to Vdd/2. Thereafter, the selection signal SELn is made OFF (application is suspended; made low level). Due to this, the FDs of the odd number column pixels in the n-th row are initialized to the potential corresponding to the light intensity signal at present and used for comparison at the time of the read operation in the next frame.

Thereafter, by turning on the reset transistor T1 of the selected pixel by the reset signal RSTn, the photodiode PD is initialized, and the light storage of the next frame is started.

According to the first embodiment, in each of the pixels composing the pixel array part 11, as shown in FIG. 2A, a holding function for holding a charge corresponding to the light reception intensity of the previous frame and a comparison function for comparing the strongness/weakness between the light reception intensity of the previous frame and the light reception intensity of the current frame are comprised of the coupling capacitor Cs, therefore frame memories and comparators as in the conventional case are not needed. In addition, the above holding function and comparison function can be configured by an extremely simple circuit, so the pixel area can be made small, therefore, the chip area will not be made large even when many pixels are formed, the increase of pixels can be coped with, and a reduction of the power consumption can be realized.

Further, the decision of strongness/weakness of the light reception intensity according to the sense amplifier SA is carried out in parallel among columns, but the processing speed can be improved by the amount of unnecessary write and read processings to/from the frame memory in comparison with a configuration having the frame memories and the comparators outside of the pixels and the change of light intensity can be detected at a high speed.

Note that, in FIG. 3, there is one horizontal output signal line in each of the odd number columns and even number columns (HL_o, HL_e). By preparing a plurality of these in each column and reading the data in parallel, an increase of speed of the read operation can be realized. The change of light intensity can be detected at a higher speed by that amount.

Second Embodiment

Figure 6:
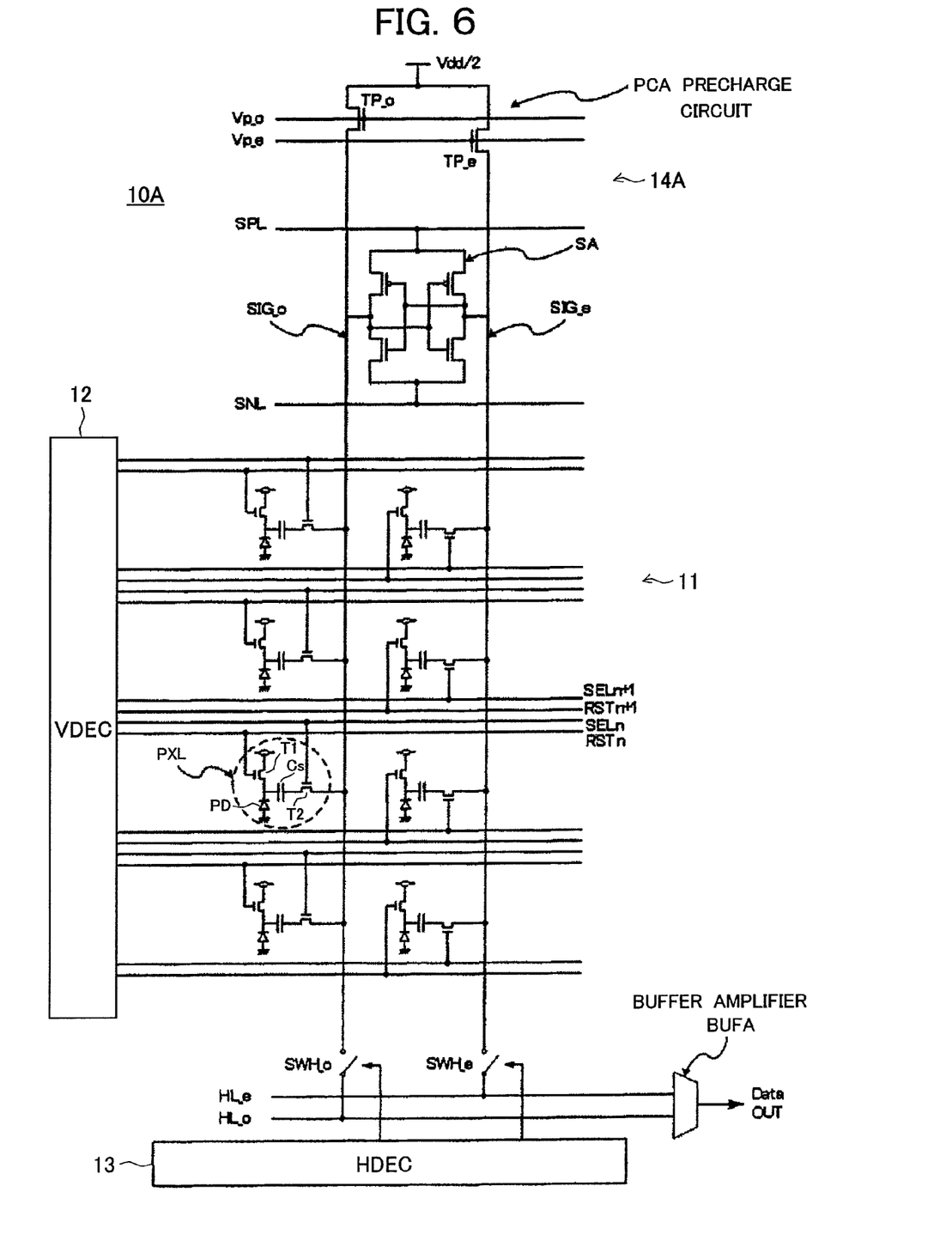
FIG. 6 is a circuit diagram showing two columns' worth of the circuit configuration of the pixel array part forming an optical sensor according to a second embodiment of the present invention.

FIG. 6 is a circuit diagram showing two columns' worth of the circuit configuration of the pixel array part forming the optical sensor according to a second embodiment of the present invention.

The configuration of the second embodiment is the same as that of the first embodiment except for the precharge circuit. Accordingly, the same portions as those of the first embodiment will be given the same notations for explanation.

The precharge part PCA of the second embodiment is not configured so that both even number column and odd number column are precharged by Vdd/2 as in the precharge part PC of the first embodiment, but is configured so that the precharge transistors TP_o and TP_e are set and different gate potentials VP_o and VP_e are applied to their gates so that the even number column and the odd number column can be precharged to different voltages.

Next, an explanation will be given of the operation of the second embodiment.

When applying the optical sensor to an application, the signal light is not always received at all pixels for each frame. There may be cases where there are pixels or periods for which the signal light is not emitted.

Even in such a situation, in the configuration of the first embodiment, due to noise, offset in the circuit design, etc., each pixel will always continuously output the signal of "1" or "0", so there is an apprehension that the signal cannot be distinguished from the real optical signal.

Accordingly, in order to distinguish between the case where there is no optical signal and the case where there is a signal, desirably the detection on one side is intentionally weighted so that the data is fixed to either of "1" or "0" when there is no optical signal. The second embodiment has a circuit configuration enabling this.

FIG. 7A to FIG. 7K are timing charts for explaining the operation of the second embodiment.

Figure 7A:
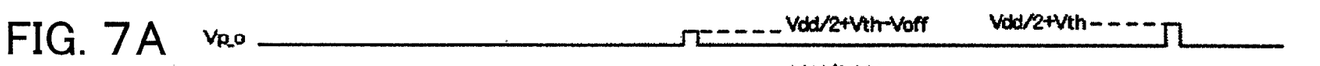
FIG. 7A to FIG. 7K are timing charts for explaining the operation of two columns' worth of the circuit shown in FIG. 6.
Figure 7B:
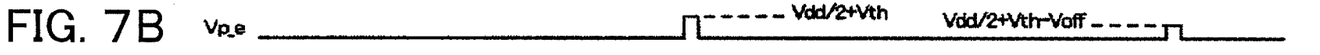
Figure 7C:
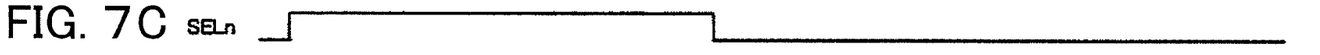
Figure 7D:
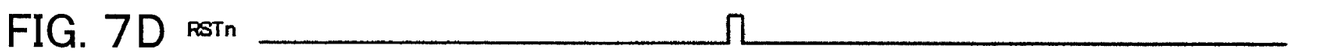
Figure 7E:
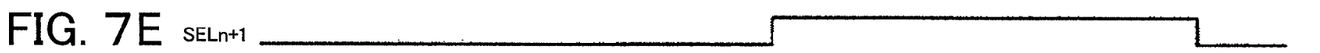
Figure 7F:
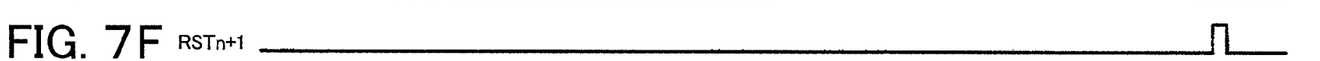
Figures 7G, 7H:
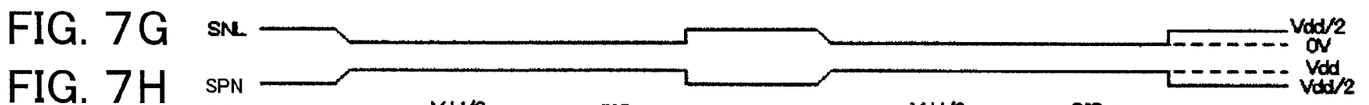
Figures 7I, 7J:
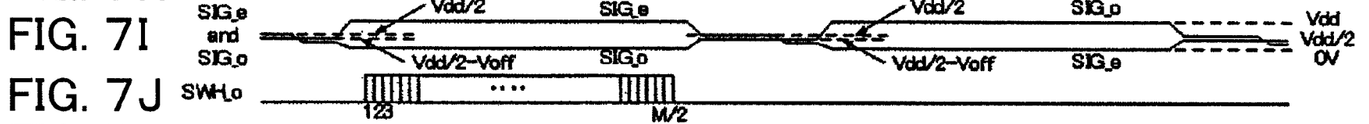
Figure 7K:
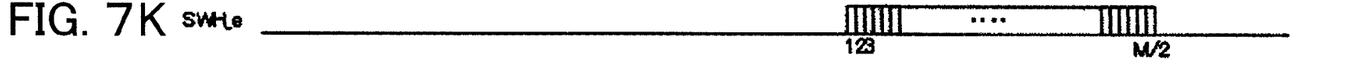

FIG. 7A and FIG. 7B indicate gate potentials Vp_o and Vp_e of precharge transistors, FIG. 7C indicates the selection signal SELn applied to the selection line SELn of the n-th row, FIG. 7D indicates the reset signal RSTn applied to the reset line RSLLn of the n-th row, FIG. 7E indicates the selection signal SELn+1 applied to the selection line SELn+1 of the n+1-th row, FIG. 7F indicates the reset signal RSTn+1 applied to the reset line RSLLn+1 of the n+1-th row, FIG. 7G indicates the bias potential SNL on the low potential side of the sense amplifier SA, FIG. 7H indicates the bias potential SNP on the high potential side of the sense amplifier SA, FIG. 7I indicates potential SIG_o and SIG_e of the odd number and even number signal lines SIGL_o and SIGL_e, FIG. 7J indicates the state of the odd number side horizontal switch SWH_o, and FIG. 7K indicates the state of the even number side horizontal switch SWH_e.

Therefore, the precharge transistors TP_o and TP_e are set for each column as explained before, and different gate potentials Vp_o and Vp_e are applied to the gates of the transistors as shown in the timing charts of FIG. 7A and FIG. 7B. When setting this, due to the phenomenon of the potential drop of the transistor, precharge potentials Vp_o and Vp_e to the signal lines SIGL_o and SIGL_e become Vp_o-Vth and Vp_e-Vth (Vth is a threshold voltage of the transistor).

That is, by controlling the Vp_o and Vp_e, it becomes possible to freely set the precharge potentials to the signal lines SIGL_o and SIGL_e. Note that it is necessary to satisfy Vp_o, Vp_e≦Vdd/2+Vth.

According to the second embodiment, precharge potentials to the signal lines SIGL_o and SIGL_e of the columns can be freely set, therefore, in order to distinguish between the case where there is no optical signal and the case where there is a signal, the detection on one side can be intentionally weighted so that the data is fixed to either of "1" or "0" when there is no optical signal, so the case where there is an optical signal and the case where there is no signal can be distinguished.

Third Embodiment

Figure 8:
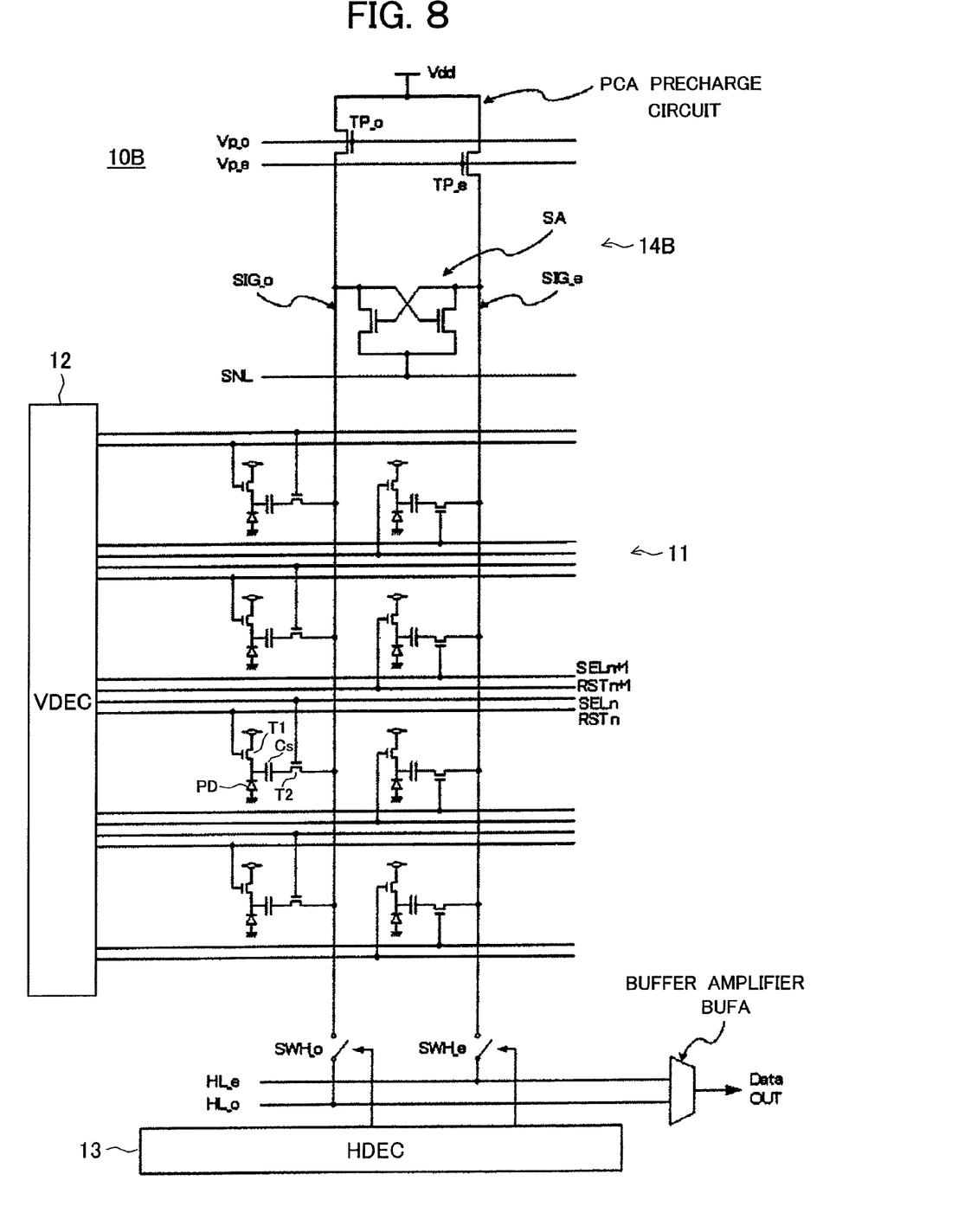
FIG. 8 is a circuit diagram showing two columns' worth of the circuit configuration of the pixel array part forming an optical sensor according to a third embodiment of the present invention.

FIG. 8 is a circuit diagram showing two columns' worth of the circuit configuration of the pixel array part forming the optical sensor according to a third embodiment of the present invention.

The configuration of the third embodiment is the same as that of the second embodiment except for the sense amplifier circuit. Accordingly, portions the same as those in the second embodiment are given the same notations for explanation.

The configuration of an optical sensor 10B of the third embodiment is substantially the same as the configuration of the optical sensor of the first embodiment, but differs from the latter in the point that the sense amplifier SA is configured by only NMOS transistors and the power supply voltage of the precharge circuit portion PC is set at Vdd and the point that the precharge transistors TP_o and TP_e are set so that the even number column and the odd number column can be precharged to different voltages, different gate potentials Vp_o and Vp_e are applied to their gates, and the offset voltages in the signal lines SIGL_o and SIGL_e can be set.

Next, an explanation will be given of the operation of the third embodiment with reference to the timing charts of FIG. 9A to FIG. 9J.

Figure 9A:
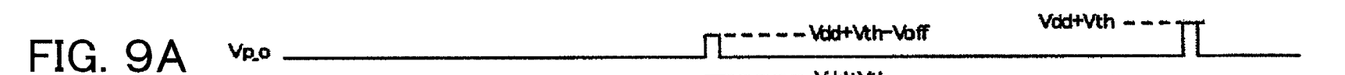
FIG. 9A to FIG. 9J are timing charts for explaining the operation of two columns' worth of the circuit shown in FIG. 8.
Figure 9B:
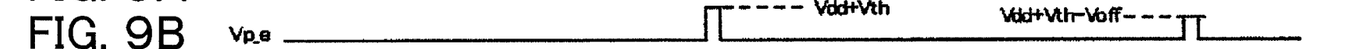
Figure 9C:
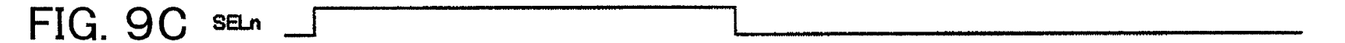
Figure 9D:
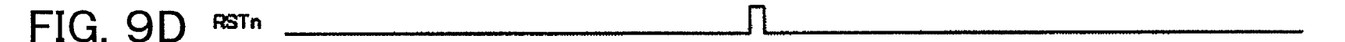
Figure 9E:
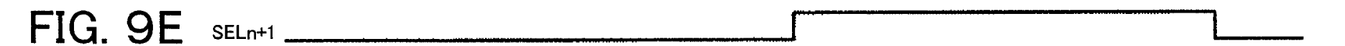
Figure 9F:
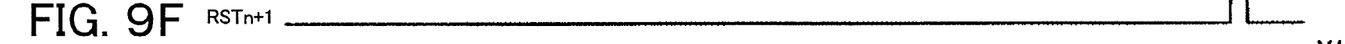
Figure 9G:
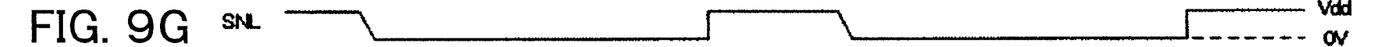
Figure 9H:
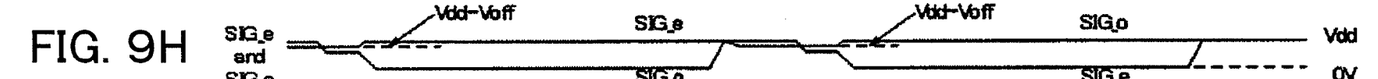
Figures 9I, 9J:
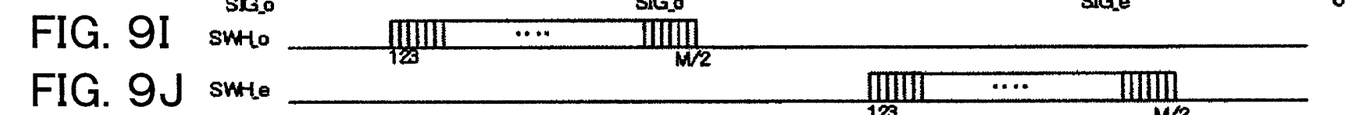

FIG. 9A and FIG. 9B indicate gate potentials Vp_o and Vp_e of precharge transistors, FIG. 9C indicates the selection signal SELn applied to the selection line SELn of the n-th row, FIG. 9D indicates the reset signal RSTn applied to the reset line RSLLn of the n-th row, FIG. 9E indicates the selection signal SELn+1 applied to the selection line SELn+1 of the n+1-th row, FIG. 9F indicates the reset signal RSTn+1 applied to the reset line RSLLn+1 of the n+1-th row, FIG. 9G indicates the bias potential SNL on the low potential side of the sense amplifier SA, FIG. 9H indicates potentials SIG_o and SIG_e of odd number and even number signal lines SIGL_o and SIGL_e, FIG. 9I indicates the state of the odd number side horizontal switch SWH_o, and FIG. 9J indicates the state of the even number side horizontal switch SWH_e.

First, when the data of the change of the light intensity is read out from the odd number column, the gate potentials Vp_o and Vp_e of the precharge transistors TP_o and TP_e are set to VDD+Vth and VDD+Vth−Voff by considering the phenomenon of the potential drop of the transistor. Here, Voff is a voltage value smaller than Vth.

Due to this, precharge potentials of signal lines SIGL_o and SIGL_e become VDD and VDD−Voff. When the light reception intensity of the pixel becomes large with respect to the previous frame in this state, the potential SIG_o of the signal line SIGL_o is offset downward. Thereafter, when the bias voltage SNL of the sense amplifier SA is lowered from Vdd, in the case where the signal line potential SIG_o changes in intensity to larger than Voff, the signal line potential SIG_o becomes 0V, and the signal line potential SIG_e is amplified to Vdd.

Due to this, it becomes possible to distinguish a noise component etc. and the optical signal and output the "0" data, when the timing when the light is turned on is detected and the "1" data in cases other than that.

According to the third embodiment, the sense amplifier SA is configured by only NMOS transistors, therefore the circuit configuration of the sense amplifier SA can be simplified, the circuit scale of the optical sensor can be made smaller by that amount, and the size can be reduced. The rest of the effects are the same as those of the first and second embodiments.

Fourth Embodiment

Figure 10:
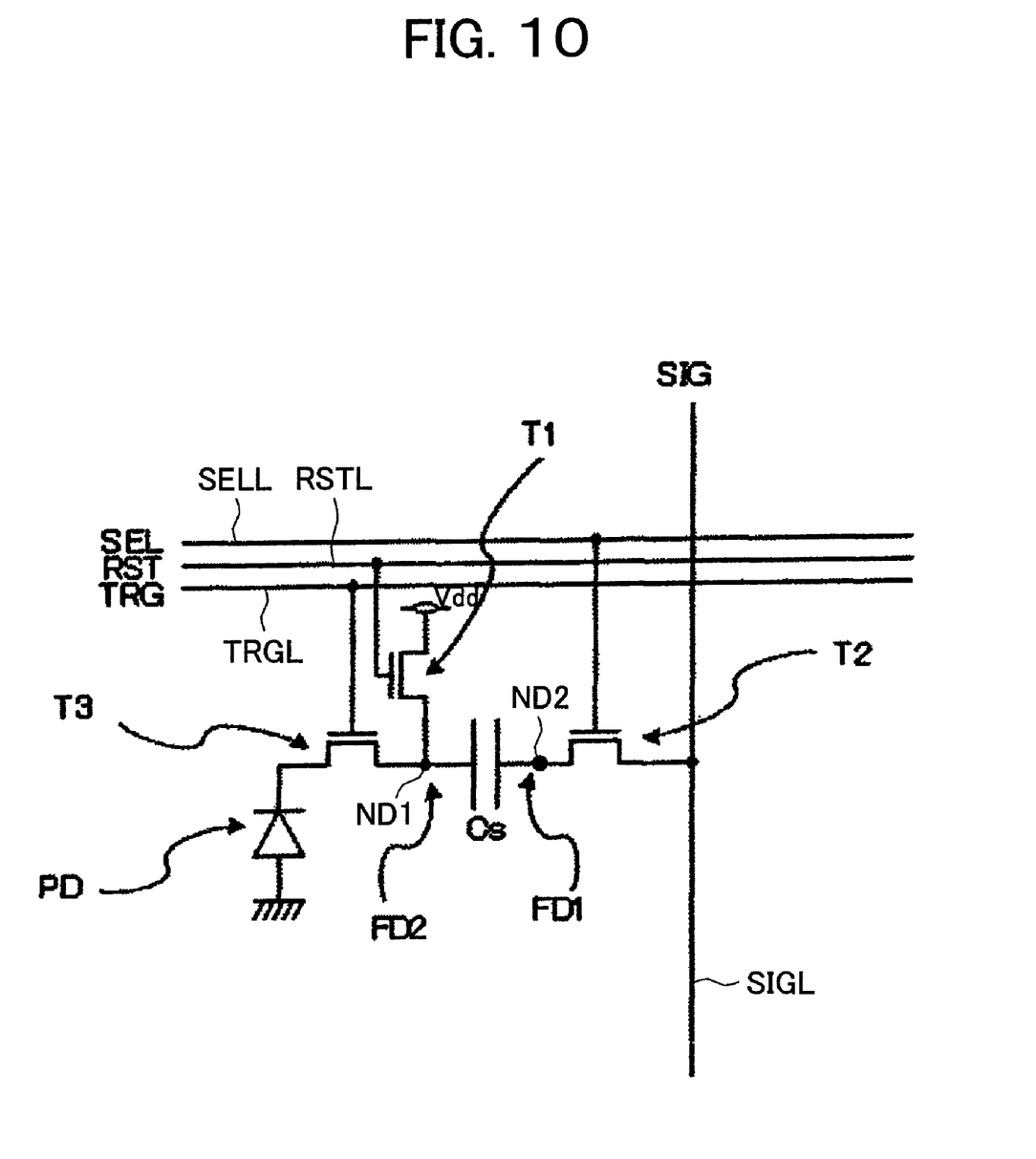
FIG. 10 is a circuit diagram showing the configuration of the pixel of an optical sensor according to a fourth embodiment of the present invention.

FIG. 10 is a circuit diagram showing the structure of a pixel of an optical sensor according to a fourth embodiment of the present invention.

In FIG. 10, portions the same as those of the first embodiment shown in FIG. 2A will be given the same notations for explanation.

The pixel structure of the fourth embodiment is substantially the same as that of the first embodiment, but a transfer transistor T3 is newly added between the photodiode PD and the capacitor Cs. Further, the source of the reset transistor T1 is connected to the floating node FD2 between the transfer transistor T3 and the capacitor Cs.

More concretely, a source and drain of the transfer transistor T3 are connected between the cathode of the photodiode PD and the node FD2 (source of the reset transistor T1). Then, the gate of the transfer transistor T3 is connected to a selection line (trigger line) TRGL to which a trigger signal TRG is applied at a predetermined timing by the V decoder part 12.

Note that the column configuration of the optical sensor of the present embodiment is substantially the same as that of the first embodiment, but by changing the pixel as in FIG. 10 and adding a selection line TRG for controlling the transfer transistor T3, the operation explained below can be accomplished.

Next, an explanation will be given of the operation of the fourth embodiment related to the timing charts of FIG. 11A to FIG. 11L.

Figure 11A:
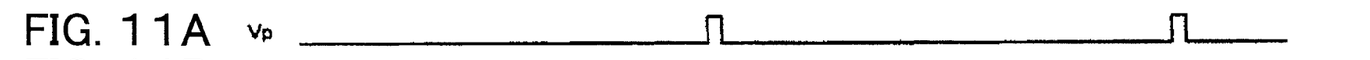
FIG. 11A to FIG. 11L are timing charts for explaining the operation within the pixel shown in FIG. 10.
Figure 11B:
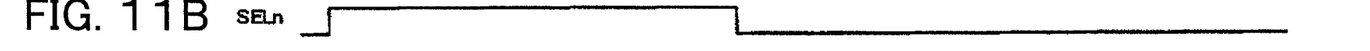
Figure 11C:
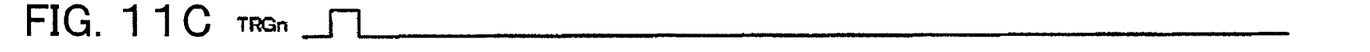
Figure 11D:
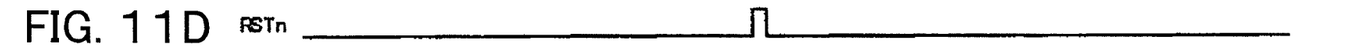
Figure 11E:
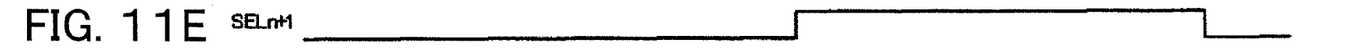
Figure 11F:
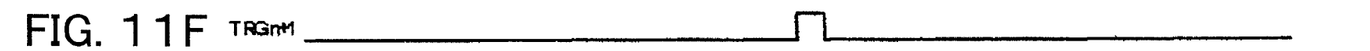
Figure 11G:
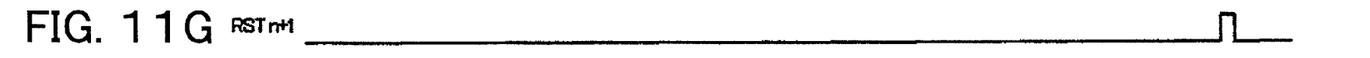
Figures 11H, 11I:
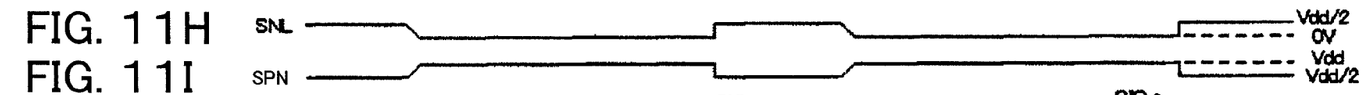
Figure 11J:
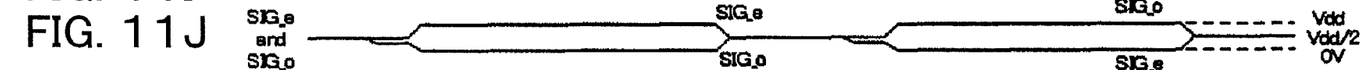
Figure 11K:
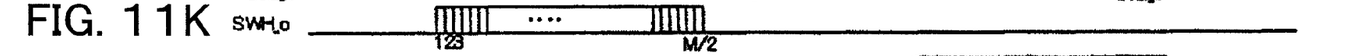
Figure 11L:
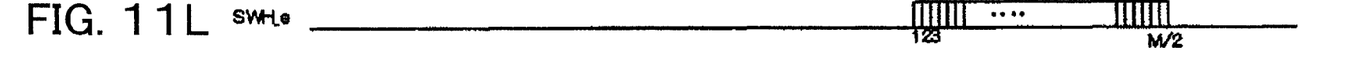

FIG. 11A indicates the precharge potential (signal) Vp applied to the precharge line PCL, FIG. 11B indicates the selection signal SELn applied to the selection line SELn of the n-th row, FIG. 11C indicates a trigger signal TRGn applied to the selection line TRGL of the n-th row, FIG. 11D indicates the reset signal RSTn applied to the reset line RSLLn of the n-th row, FIG. 11E indicates the selection signal SELn+1 applied to the selection line SELn+1 of the n+1-th row, FIG. 11F indicates a trigger signal TRGn+1 applied to the selection line TRGL of the n+1-th row, FIG. 11G indicates the reset signal RSTn+1 applied to the reset line RSLLn+1 of the n+1-th row, FIG. 11H indicates the bias potential SNL on the low potential side of the sense amplifier SA, FIG. 11I indicates the bias potential SNP on the high potential side of the sense amplifier SA, FIG. 11J indicates potentials SIG_o and SIG_e of odd number and even number signal lines SIGL_o and SIGL_e, FIG. 11K indicates the state of the odd number side horizontal switch SWH_o, and FIG. 11L indicates the state of the even number side horizontal switch SWH_e.

The operation of the fourth embodiment is substantially the same as that of the first embodiment, but immediately after turning on the selection transistor T2 by applying the selection signal SEL to the selection line SELL of the row, the trigger signal TRG is applied to the selection line (trigger line) TRGL of the same row to turn on the transfer transistor T3 and transfer the charge.

Assuming that the charge transfer at this time is a complete transfer (the entire charge in the PD being completely transferred), the state after the charge transfer becomes equivalent to that where the photodiode PD is reset, so a reset scan of the photodiode PD part is not necessary.

Further, the same operation as that of the first embodiment is carried out in the scan after the charge is transferred to the floating node FD2, but after the completion of data detection, the reset transistor T1 is turned on by the reset signal RST, and the floating node FD2 is reset.

According to the fourth embodiment, the capacitor Cs cannot be directly connected to the photodiode PD in a case where the photodiode PD has a buried photodiode structure frequently used in a CMOS image sensor etc., but the capacitor Cs can be connected to the photodiode PD via the transfer transistor T3 for separating the photodiode PD part and the capacitor Cs, and the holding function for holding a charge corresponding to the light reception intensity of the previous frame and the comparison function for comparing the strongness/weakness of the light reception intensity of the previous frame and the light reception intensity of the current frame can be provided within the pixel in the same way as the first embodiment.

Further, according to the fourth embodiment, the noise of a dark current etc. inherent in the buried photodiode can be suppressed by interposition of the transfer transistor T3, and effects the same as those of the first embodiment can be obtained.

Fifth Embodiment

Figure 12:
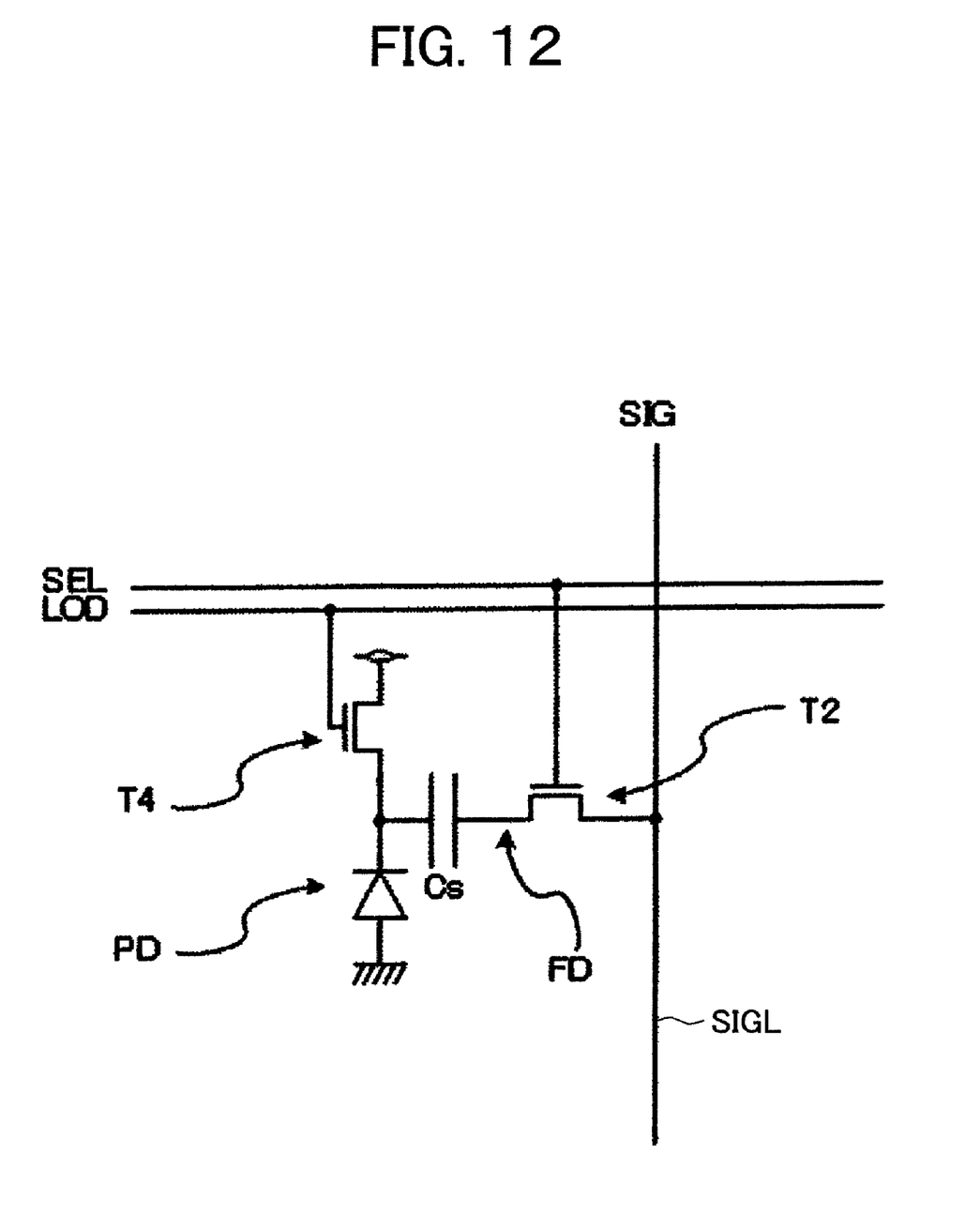
FIG. 12 is a circuit diagram showing the configuration of the pixel of an optical sensor according to a fifth embodiment of the present invention.

FIG. 12 is a circuit diagram showing the configuration of a pixel of an optical sensor according to a fifth embodiment of the present invention.

In FIG. 12, the same portions as those of the first embodiment shown in FIG. 2A will be given the same notations for explanation. This pixel structure is equivalent to that of FIG. 2A, but the role of the transistor T4 connected to the photodiode PD is different.

Namely, the fifth embodiment assumes a case where the received light is strong or a case where the photodiode PD is sufficiently large. In such a case, the charge excited in the photodiode PD by the light is sufficiently large, therefore the photodiode PD can be regarded as a current source.

Accordingly, when the transistor T4 acting as the load is set between the power supply and the photodiode PD, this transistor T4 functions as the load of the current source, and a potential in accordance with the current value of the photodiode PD, that is, the light intensity, will appear in the photodiode PD part. Accordingly, when this is received at the coupling capacitor Cs, the coupling capacitor Cs has the holding function for holding a charge corresponding to the light reception intensity of the previous frame and the comparison function for comparing the strongness/weakness of the light reception intensity of the previous frame and the light reception intensity of the current frame the same as those of the first embodiment, so the same mode of operation can be obtained.

Note that the embodiments of the present invention are not limited to the above. The invention can be executed in other ways too in concrete configuration, functions, mode of operation, and effect within the range not out of the gist thereof.

For example, the above embodiments are predicated on all cells in the array being read out one after another, but according to some applications, it is not necessary to read out all cells. It is possible to read out only a certain specific area in the array, read out any cell according to an address designation from the outside as in a DRAM, or read out cells while changing the read portion one after another by an external controller.

When this function is utilized, it is also possible to detect a cell in which there is an optical signal by an overall survey first, then specify the reading of only that cell, so it becomes possible to perform higher speed data communications.

Further, as an output technique, a method of not reading the data of the signal line as it is to the horizontal signal line as in the above embodiments, but providing a data buffer for each column, temporarily stocking the data, then sequentially outputting the data to the outside can be considered. In this case, the read operation of the data to the outside and the read operation of the column can be separated, therefore a pipeline operation for performing operations in parallel becomes possible and higher speed detection and read operations become possible.

INDUSTRIAL APPLICABILITY

The optical sensor and method of pixel selection of the present invention enable reduction of the pixel area without degrading the increase of speed of the detection of the change of light intensity and the reduction of the power consumption, therefore can reduce the size of the chip at the time of increase of pixels, therefore can be applied to a camera system etc. using the blinking of LEDs for communications.

The invention claimed is:

1. A method of generating signal information with an optical sensor comprising: a pixel array part in which a plurality of pixels are arranged, and a pixel selection part for selecting pixels for reading the pixel information from among said plurality of pixels,
    a comparing part for processing the pixel signals selected by said pixel selection part,
    said method including:
        comparing a pixel signal of a first time with a corresponding pixel signal from a second time to generate an information signal corresponding to a transmitted data based on the comparison.

2. A method of generating signal information as set forth in claim 1, including:
    discriminating pixels satisfying predetermined conditions and changing said selected pixels according to that discrimination information.

3. A method of generating signal information with an optical sensor as set forth in claim 1, wherein said comparing part compares a capacitor having a first electrode connected to a photodiode and having a second electrode connected to a selection transistor for selecting said pixel under the control of the pixel selection part, said second electrode of said capacitor is initialized by a potential of the photodiode at the first time, and the potential of said second electrode changing according to the potential of the photodiode at said second time is transmitted via a signal line.

4. A method of generating signal information with an optical sensor as set forth in claim 3, further comprising detecting a potential change of said second electrode by comparing the potential of said second electrode sent from said selection transistor via the signal line with a reference potential to form binary data.

5. A method of generating signal information with an optical sensor as set forth in claim 4, wherein said reference potential has an intermediate value between a ground voltage and a power supply voltage.

6. A method of generating signal information with an optical sensor as set forth in claim 1, further comprising sharing a detection part with adjacent columns of said pixel array part, and wherein the signal line of adjacent columns is precharged by a reference potential before the potential detection of said second electrode, and signal amplification is carried out by using a second column as the reference at the time of the reading of a first column, and using the first column as the reference at the time of the reading of the second column.

7. A method of generating signal information with an optical sensor as set forth in claim 6, further comprising applying potentials which are different by an amount of an offset to the columns as said precharge potential.

8. A method of generating signal information with an optical sensor as set forth in claim 1, further comprising resetting said photodiode with a reset transistor.

9. A method of generating signal information with an optical sensor as set forth in claim 7, wherein a transfer transistor is connected between said photodiode and said capacitor, and a reset transistor for resetting said capacitor is connected to a connection portion of the transfer transistor and said capacitor.

10. A method of generating signal information with an optical sensor as set forth in claim 8, further comprising holding a potential determined between a current constantly generated in said photodiode and said reset transistor.

11. A method of generating signal information with an optical sensor as set forth in claim 1, further comprising changing the pixels selected by the pixel selection part.

* * * * *